United States Patent [19]

Paton et al.

[11] 3,961,584
[45] June 8, 1976

[54] RAILWAY CAR TRUCK

[76] Inventors: Hamilton Neil King Paton, 2521 W. Montlake Place E., Seattle, Wash. 98112; John B. Skilling, 3000 Webster Pt. Road NE., Seattle, Wash. 98105

[22] Filed: Apr. 3, 1974

[21] Appl. No.: 457,424

Related U.S. Application Data

[63] Continuation-in-part of Ser. No. 353,371, April 23, 1973, abandoned, which is a continuation of Ser. No. 189,379, Oct. 14, 1971, abandoned.

[52] U.S. Cl.......................... 105/182 R; 105/199 R; 105/199 F; 105/206 A; 105/206 R; 105/224 A; 105/224.1; 267/3; 308/137; 308/138; 308/223

[51] Int. Cl.²...................... B61F 3/08; B61F 5/14; B61F 5/18; B61F 5/30

[58] Field of Search............ 105/182 R, 197 R, 198, 105/199 R, 199 S, 206 R, 206 A, 224.1, 199 CB, 199 F, 200, 202, 208, 224 A; 267/63 A, 3, 63 R; 280/81; 308/137, 138, 225, 226, 221, 223, 239

[56] References Cited
UNITED STATES PATENTS

| | | | |
|---|---|---|---|
| 538,858 | 5/1895 | Adams........................ | 105/199 R X |
| 621,826 | 3/1899 | Kling............................ | 105/199 R X |
| 682,406 | 9/1901 | Fassett......................... | 308/226 |
| 701,416 | 6/1902 | Susemihl et al.............. | 308/226 |
| 710,609 | 10/1902 | Pungs......................... | 308/226 X |
| 710,673 | 10/1902 | Fassett......................... | 308/226 |
| 717,304 | 12/1902 | Wands......................... | 105/197 R |
| 1,020,276 | 3/1912 | Gambrel....................... | 105/199 S |
| 1,038,481 | 9/1912 | Blake........................... | 105/198 |
| 2,034,504 | 3/1936 | Bugatti........................ | 105/199 R X |
| 2,058,955 | 10/1936 | Culemeyer................... | 280/81 |
| 2,150,896 | 3/1939 | Muchnic....................... | 105/199 R |
| 2,154,586 | 4/1939 | Stern............................ | 267/63 R |
| 2,166,858 | 7/1939 | Bugatti........................ | 105/182 R |
| 2,168,293 | 8/1939 | Kiesel, Jr. .................... | 105/182 R |
| 2,354,016 | 7/1944 | Haynes........................ | 105/182 R |
| 2,907,283 | 10/1959 | Markestein et al........... | 105/182 R |
| 2,917,005 | 12/1959 | Furrer et al. ................. | 105/199 S X |
| 3,020,857 | 2/1962 | Dean............................ | 105/199 R |
| 3,181,479 | 5/1965 | Rumsey et al. ............... | 105/197 R |
| 3,338,183 | 8/1967 | Boissier....................... | 105/206 R |
| 3,350,146 | 10/1967 | Williams...................... | 308/138 |
| 3,451,355 | 6/1969 | Dobson et al................ | 105/199 R X |
| 3,570,409 | 3/1971 | Oelkers........................ | 105/199 R X |
| R5,452 | 6/1873 | Higley.......................... | 105/224.1 |

*Primary Examiner*—Robert J. Spar
*Assistant Examiner*—Howard Beltran
*Attorney, Agent, or Firm*—Dowrey & Cross

[57] ABSTRACT

A truck is provided with a torsionally compliant transverse member connecting to transversely spaced side frames. The side frames are suspended on the axles by a spring suspension system of generally cylindrical elastomer elements and a combined damping system. Both springing and damping are generally exponentially variable relative to increases in the load in the railcar. A central pivot pin transfers lateral and longitudinal loads between the truck and the car body without transferring substantial vertical loads. The center pin mounting in the torsionally compliant member is compliant. Vertical loads are transferred between the car body and the truck by omni-directional vertically-incompressible low friction side bearings.

27 Claims, 31 Drawing Figures

FIG. 26

RAILWAY CAR TRUCK

CROSS REFERENCE TO RELATED APPLICATIONS

This application is a continuation-in-part of Ser. No. 353,371, filed Apr. 23, 1973, now abandoned, which is a continuation of Ser. No. 189,379, filed Oct. 14, 1971, now abandoned. Details of the description from these two patent applications are incorporated herein by reference thereto.

BACKGROUND OF THE INVENTION

Little basic change has taken place in the principles of railroad freight car truck design since the late 1800's. The vehicles which ride on these trucks have changed radically, as have the vehicle load-carrying requirements and operating speeds. To meet the rapidly increasing demands for higher capacity and greater speed, truck designers merely scaled up. When a problem developed in one component, that component would be beefed up or some ancillary device would be added. Subsequently, problems were not solved but, rather, were chased from one component to another throughout the system.

Since elastic deformations of both rail and wheel, in contact with one another, are relatively small, rail joints, track gage and cross-level, and other rail conditions, all dynamically affect the wheels, axles and bearings as well as the dependent truck superstructure and suspension, carbody, and finally — but most importantly — the responsive lading in the car. The problems that the railroads are currently encountering in operation of freight cars with current track conditions and existing equipment are: rock-and-roll which is a resonant rolling mode induced by staggered rail joints being encountered alternately by the wheels on either side of the truck at low speed; high speed hunting which is an oscillation induced by the tendency of a wheel to recenter developing into a resonant lateral chatter during high speed operation; and the inability of standard truck design to control random motions which results in multiplication of forces developed during resonance.

A standard truck consists of 4 wheels, fixed in pairs on axles. The axles are fitted on the ends with roller bearings and are held substantially parallel by a pair of side frames. The side frames are fixed loosely by way of an adapter and a keeper to the roller bearing. Each side frame is a rigid truss member which spans between the axles and has an opening at its center called a spring pocket. This spring pocket contains a group of springs which support a bolster member. The bolster is a rigid transverse member which spans between the side frames, passing through the spring pockets, and is supported at its ends by the spring groups. At the center of the bolster is a center bowl. The center bowl supports the weight of the car by means of a mating centerplate which is affixed to the understructure of the car. The car is thereby supported on 2 points; one at each end of the car which gives a tendency to rock to one side or the other. The tendency of the car to rock is resisted by two side bearings, located on either side of the center bowl. Each side bearing is set with a clearance so that the carbody is not in contact unless it rocks to one side.

The axles are fixed to the wheels and the wheels, therefore, must rotate at the same speed. The wheels are tapered so that they tend to center themselves or so that when they ride up on a curve, the outer wheel can move to a larger radius allowing the wheels to remain traveling at the same speed. The bearings are press-fitted to the ends of the axles and are clamped into the end of the side frames by way of an adapter and keeper. The adapter is shaped so that the axle can rotate relative to the side frame in a horizontal plane without wracking or eccentrically loading the bearing. It is also set with a clearance so that it is allowed to move laterally in the opening. The keeper is not in contact with the bearing, but is placed so that the bearing cannot fall out. The relationship between the side frame and the bolster is approximately the same. The bolster is allowed to rotate relative to the side frame and to move laterally in the spring pocket and is engaged by a stop at the extreme position. These relative clearances and motions are allowed with the design purpose of preventing excessive twisting or wracking stresses in the bearing, the side frame, and the bolster end during operation. Unfortunately, to allow motion is to allow wear and to allow motion with the forces of the magnitude encountered by or developed by a railroad car, is to allow extremely high-impact forces and dynamic forces to develop.

The classes of devices presented as solutions to existing truck problems range from mechanical and hydraulic spring snubbers to constant contact side bearings and other truck-to-car body supportive arrangements. In every operating situation currently in the U.S., Canada and Mexico truck suspension elements include steel coil springs. Ancillary devices offered to control harmonic and other problems caused by use of steel coil springs include: steel volute springs (snubbers); hydraulic snubbers; steel friction snubbers. Each of these devices produces some special side effect that results in increased wear, maintenance, stress levels, fatigue, damage and cost. The same holds true for so-called constant-contact side bearings and truck bolster — body bolster devices which directly affect the members to which they are affixed or contact as well as other, non-directly related parts of the entire system.

For example, a recent truck hunting investigation made by the Seaboard Coast Line and the Pullman-Standard Division of Pullman Incorporated, one a major railroad and the other a major railroad car building company, described standard 3-piece truck frames as oscillating with respect to the carbody in a parallelogram motion with displacement in the magnitude of one inch as being common throughout the test between carbody and truck sideframe. The centerplate bowl of the truck bolster oscillated with respect to the carbody in a translational as well as a swivel motion. Vertical and lateral accelerations of the two side frames were cyclical. Longitudinal accelerations were out of phase with respect to each other. Centerplate wear resulted in maximum centerplate longitudinal movement measured between carbody and truck bolster of 0.8 inches at 50 and 55 mph., indicating accelerated wear taking place during truck hunting.

In a conventional truck, in addition to the wheel axles, bearings and adapters, the side frames (which are the majority of the truck weight) are unsprung. The greater the weight of unsprung items the greater the magnitude of forces that are transferred into the car body for a given rail input. Friction damping in conventional trucks is created by two pieces of steel which rub together. Furthermore, the majority of the damping (when there are attempts made to solve dynamic problems) is obtained by hydraulic devices which are supplementary to the basic truck system. These hydraulic devices have the problem of being proportional to the velocity of motion rather than being proportional to distance travelled or rather than being proportional to the load in the car and, consequently, in a lightly loaded car where high frequency motion obtains, the damping becomes excessive and the forces transmitted to lading in the car became excessive.

Conventional trucks cannot adequately accommodate track twists found in service today and also maintain an adequate static load on the unloaded wheel. Without adequate loading, the unloaded wheel can easily climb the rail. Constant contact side bearings in conventional trucks further complicate the truck accommodation to the track twist problem because these side bearings require a certain amount of force to depress them.

SUMMARY OF THE INVENTION

The truck of the present invention includes, from the rail up, standard wheels, axles and bearings. The bearings are contained in a unique suspension that is itself mounted by a unique truck frame. The truck side frames carry the carbody through unique side bearings with the side frame interconnecting structure taking no vertical load but taking all horizontal loads through a unique truck centering device. The side frame interconnecting member is torsionally compliant with almost any degree of track imperfection causing the side frames to have "walking" characteristics to maintain relatively constant loading on each of the four wheels per truck.

The truck of this invention provides a damped action throughout its range of interconnecting points between the carbody and the track. This assures an improved ability to reduce truck hunting. The truck suspension includes a unique elastomeric suspension system which has self-damping capabilities in two directions to further reduce truck hunting.

By damping out harmonic forces, the truck's tendency to oscillate from side to side on tangent (straight) track can be reduced to non-critical levels for greater safety, as well as reduced maintenance and replacement costs. By greatly reducing vertical acceleration of the sprung mass of the truck and of the carbody and lading, damage becomes controllable and its almost total elimination can be foreseen.

The truck of the invention does not economically penalize the advantages it offers. Both weight and cost estimates on a present-day basis of comparison indicate an extremely favorable and competitive production cost feasibility. The truck uses conventional brake systems, roller bearings and standard wheels and axles which makes retro-fit simple. Also, design for new cars based on the truck 4 point support system promises valuable construction cost reduction and more efficient carbody design. An indication of dynamic performance improvements possible with this truck system vs. standard 3-piece trucks based on dynamic analyses and field tests are as follows:

| ITEM | TRUCK OF THIS INVENTION AS A % OF STD. TRUCK |
|---|---|
| Maximum Carbody Motions: | |
| Horizontal | 22% or 1/4.54 |
| Vertical | 40% or 1/2.5 |
| Rotational (Rock-and-Roll) | 18% or 1/5.55 |
| Maximum Carbody Accelerations | |

| ITEM | -continued TRUCK OF THIS INVENTION AS A % OF STD. TRUCK |
|---|---|
| Horizontal | 14% or 1/7.14 |
| Vertical | 5% or 1/20 |
| Maximum Forces on Rail | |
| Horizontal Load | 10% or 1/10 |
| Vertical | 26% or 1/3.85 |
| Vertical Acceleration | 22% or 1/4.54 |

Rubber (natural, modified for maximum longevity) has been well proven over many years for both primary and secondary suspensions in rail and road vehicles, both domestically and abroad. Rubber is also the best known vibration reducing material due to its inherent (if small) damping qualities vs. steel springs which give virtually total vibration transmisability. Also during severe excursions, rubber spring members cannot "bottom out" as can steel suspension springs — nor can rubber elements break, as steel springs do. The use of rubber suspensions in transportation vehicles of almost all classes have been hampered by one major drawback, and that is the lack of sufficient inherent damping to satisfy all the loading conditions.

The suspension system of this invention of rubber elements and special friction damping means in conjunction with the special adapter units provides a wide variety of possibilities as to design for varying ranges of load requirements. An example would be where a refrigerator car carries light loads of highly perishable and easily damaged fruit products, such as pears, peaches, etc., but on return trips may be carrying very heavy frozen foods or canned goods. Our suspension system provides a soft ride with definite lading damage reduction capabilities vs. any form of standard steel spring system or existing elastomeric system without relying upon expensive, high-maintenance hydraulic shock absorbers in conjunction with their use.

In order to accommodate track twist on the order of 1 inch in 150 inches which, for a 43-foot truck center car with what might be considered to be an infinitely stiff body, such as a covered hopper car or tank car, unless conventional side bearings are used which have an air gap of approximately ⅜ inch when the car is on a level track, it is not possible with any other system to comply with such a track twist and still retain approximately 40% of the car weight on the track on the light loaded wheels of the car/trucks.

Attempts currently in the U.S. to introduce so-called constant contact side bearings defeat this purpose by eliminating the air gap which, in combination with the standard steel coil springs which produce a linear spring curve can cause wheel lift under far less stringent conditions than the 1 inch in 150 inches requirement as set forth by European and British railway systems for safety purposes.

The truck of this invention is able to meet this requirement by reason of the total combination of compliant members and suspension elements previously discussed. Because the truck is based on an elastically rigid system, it is possible to rationally analyze it. A standard truck with all loose members is not possible to analyze rationally. Irrespective of the improvements in reducing lading damage, carbody damage and truck component damage inherent in the truck system of this invention, it is necessary to consider the public safety aspect and the reduced potential of derailment offered by this truck over conventional 3-piece trucks.

An invention of this application provides a reduction in the effects of the various reaction forces resulting from the aforementioned track conditions by a unique combination of features which cooperate with one another to support the varying loads of railway car lading and dampen dynamic force reactions throughout the truck and its connection with the railway car body. This combination of elements essentially comprises cylindrical elastomeric rod spring arrangements coupled with a compliant damping mechanism, a distribution of lateral springing over various elements of the truck including a center pin spring to accept significant lateral movement, a torsionally free bolster that is relatively stiff in its longitudinal direction, and omni-directional load carrying side bearings. Damping is carried out primarily through the spring and damping mechanism with additional inherent damping occurring at the side bearing and lateral springs.

All forces acting on the wheel bearings are symmetrical around the actual center of the axle of the truck reducing undesirable moments that would otherwise increase wear and change the entire system loading characteristic. The spring and damping system allows the car body to carry lightweight easily damaged lading, such as fruit, with a soft spring at initial loading and increasingly becomes a very hard spring at the point of overturning or bump in severe dynamic conditions such as maximum rock-and-roll condition. The compliant damping system results in an increase in the amount of friction damping substantially proportional to the increase in load so that with a heavily loaded car there is significantly more damping that for a lightly loaded car. The springs are located between the axles and the side frame thus advantageously reducing the unsprung mass of the truck. Providing a very stiff bolster in its longitudinal direction makes it stiff in the tramming direction and highly stiff in the parallelogramming direction. By providing this stiffness, a significant increase in bearing life occurs due to the fact that both parallelogramming and tramming will be greatly reduced and thus racking forces on the axle bearings will be greatly reduced.

The center spring provides both a sprung and a damped rotational movement (about a vertical axis through the truck center) with no vertical load transmitted to the truck through the center pin. The friction damped compliance of the spring at the center pin helps to reduce rock-and-roll motion by allowing cushioned motion between the car body and the truck reducing the critical dynamic lateral forces transmitted between the railway car body and the truck.

Omni-directional side bearings provide additional longitudinal, lateral and rotational friction damping between the rail car and the truck coupled with the additional inherent damping of the center spring. Each side bearing includes two lateral surfaces, one of which is planar. The side bearings allow free longitudinal and rotational movement between the railway car body and the truck and provide the sole vertical load carrying connection between the car body and truck. The side bearings also provide freedom of motion about their centroids to maintain full contact of their planar surface in contact with the mating car surface. This is particularly important in avoidance of high localized stress concentrations in the side bearings and mating car body surfaces. The side bearings are located close to the side sills of the car thus reducing bending moments in the railway car body bolsters and allowing the side sills to carry almost the entire vertical load. The side bearings are vertically incompressible relative to the side frames and provide an increase in friction damping proportional to the increase in load in the car body. The side bearings are kept in constant contact when in use by the car body weight and the main load carrying springs.

The truck can advantageously be installed in existing railway cars to allow retrofit with minor car body stiffening in localized areas and replacement of existing highly damage-prone center plates.

The truck of the preferred embodiment has been put through rigorous dynamic computer analyses for various track conditions including rock-and-roll track with a ¾ inch amplitude out of cross level and staggered 39 feet track joints, a crossing condition with two inch drop in 20 feet, a bump condition on one rail at ¾ of an inch of vertical displacement, and a horizontal input of ¼ inch on a horizontal sine wave with amplitudes simulated from approximately 9 foot centers to 39 foot centers of rail. With these conditions, the trucks have been run at speeds varying from 10–90 miles per hour to find critical resonance speeds, if they existed and to determine forces and displacements. Another track input was ¾ inch sine wave of vertical displacement but without the staggered rails that is, with both rails going up and both rails going down at the same time.

One of the prime advantages found from the suspension system of this invention is its low unsprung mass has reduced vertical acceleration in the railway car body and thus in the lading which will greatly reduce car truck damage, body structure damage, and lading damage. Vertical acceleration for heavily loaded cars under the worst dynamic conditions indicated was approximately 0.2g's compared to vertical acceleration in excess of 4g's found with conventional trucks with the same track input and at the same speed or critical speed. Horizontal accelerations are reduced in similar proportions. For lightly loaded cars or empty cars, the vertical accelerations were approximately 0.4g's (maximum) found under the most severe dynamic conditions studied. This compared to vertical accelerations of 7–8 g's found under similar conditions with standard conventional trucks. Under rock-and-roll conditions, the maximum roll (included) angle was about 3.8° compared to approximately 9° for a similar railway car using a conventional standard truck. The horizontal input studies that were made in conjunction with the small ¼ inch amplitude vertical input were run with speeds up to 250 M.P.H. in order to simulate the effect of closer spaced horizontal input. Under the rock-and-roll condition that was previously mentioned, the 9° roll angle on tangent (straight) track can produce significant wheel lift of up to 4 inches for standard trucks but with the truck of the preferred embodiment no wheel lift was produced with a significant proportion of the load (approximately 26%) remaining on the unloaded side of the truck. Under rock-and-roll conditions, in order to put this into perspective, a railway car entering a curved track from tangent track with standard trucks would have a high probability of a resulting derailment whereas this would not be the case with the trucks of the preferred embodiment. Finally, the test with both horizontal and vertical track input were run up to speeds of 250 M.P.H. to simulate horizontal input more frequent than 39 feet (the standard rail length with staggered rail joint coupling location in United States track) and the results obtained with the sprung damped lateral motion of the truck of this invention showed no resonance and no amplified motion for any speed conditions and did not demonstrate the dynamic coupling or accumulation of the various dynamic forces which occured in standard trucks. As is readily apparent, actual computer studies on the railway car truck of this invention demonstrate highly significant improved stability characteristics which results in a safer, long lasting, less-lading and car-body-damaging type of truck than heretofor known to the railway industry.

BRIEF DESCRIPTION OF THE DRAWINGS

FIG. 10 is a longitudinal section of one of the side bearings shown in FIG. 8.

FIG. 11 is a transverse section taken through the side bearing shown in FIG. 10.

FIG. 12 is a plan of the bearing shown in FIG. 10.

FIG. 13 is an enlarged longitudinal section whereas FIG. 14 is an enlarged transverse section of the side bearing.

FIG. 14 is an enlarged transverse section of the side bearing.

FIG. 14A is a section of a first modified side bearing.

FIG. 14B is a section of a second modified side bearing.

FIG. 14C is a bottom view of the floating central bearing member of the bearing of FIG. 14B.

DETAILED DESCRIPTION OF THE PREFERRED EMBODIMENTS

Figure 1:
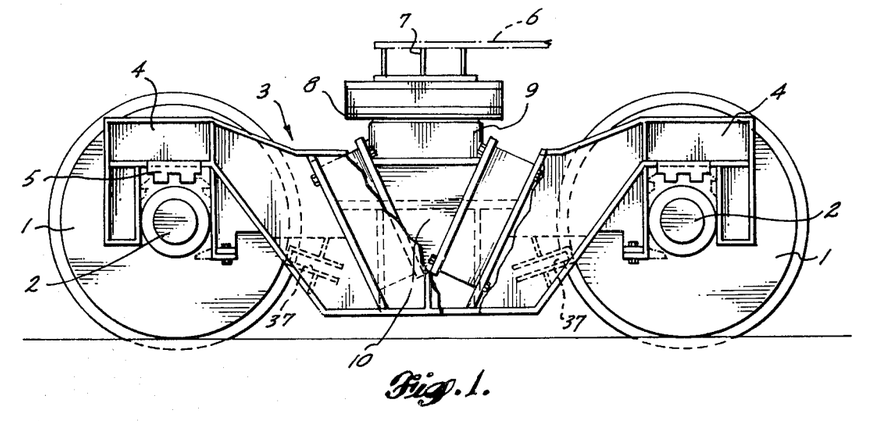
FIG. 1 is a side elevation of one form of truck embodying some of the principles of the invention.
Figure 4:
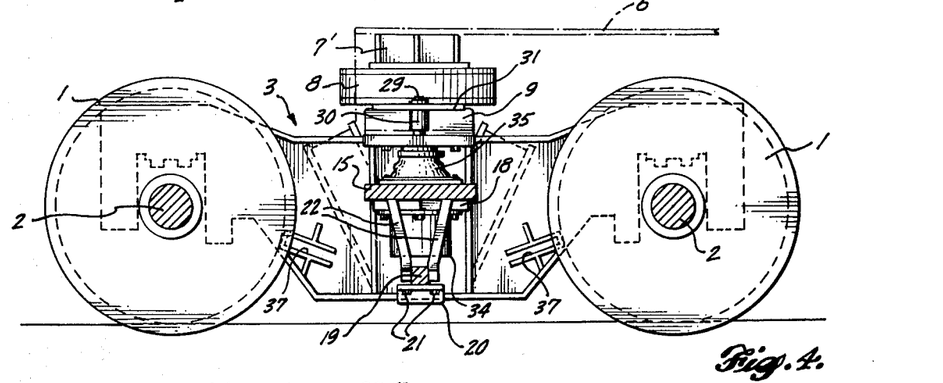
FIG. 4 is a fragmentary vertical section taken along the line 4—4 of FIG. 3.

The railway car truck structure shown in FIGS. 1 and 4 includes conventional axles 2. Side frames 3 disposed in parallel relationship and spaced transversely of the truck connect and are carried by opposite ends of the axle 2. The opposite end portions 4 of such side frames carry and are supported by axle bearings 5. Such bearings are not shown in detail and are of conventional construction.

The railway car body 6 is supported by a conventional body bolster 7 and the structure of the present invention replaces the conventional truck bolster. The body bolster 7 of the present invention has bearing-engaging support plates 8 beneath its opposite ends. Each of such plates bears on an antifriction bearing device 9. Such antifriction bearing is carried by support 10, supported by a truck side frame 3. Preferably such bearing support is mounted by structure which is compact and which will not change its position under widely varying load conditions.

The side frames 3 of the truck are connected so that the opposite side frames can rock to a limited extent about a transverse axis in order to enable the load of the railway car to be distributed equally from the wheels 1 to the track, irrespective of undulations in the track. To enable the opposite side frames to rock relatively, the structure connecting the oposite side frames is designed to twist to a limited extent when a small twisting force is applied to such structure, while the structure strongly resists any tendency of the spacing of the side frames to be varied and also strongly resists relative tilting (parallelogramming or tramming) of the side frames. A frame-connecting truss having this capability is shown best in FIGS. 2 to 5. A truss is defined as an assemblage of members typically arranged in a triangle or combination of triangles to form a rigid framework that cannot be deformed by the application of exterior force without deformation of one or more of its members.

Such frame-connecting truss includes an upper crosstie horizontal plate, forming the upper chord 15, the opposite ends of which chord plate fit between clevis flanges 16 of the truck side frames 3. Such crosstie chord ends are connected to such clevis flanges by bolts 17. The central portion of the upper crosstie is reinforced by a plate 18 secured beneath it.

The truss connecting the truck side frames further includes a lower crosstie chord bar 19 disposed parallel to and beneath the upper crosstie chord 15. The opposite ends of such lower crosstie chord are secured to anchoring angles 20 by bolts 21. Upright flanges of such angles are welded or otherwise suitably secured to the lower portions of the inner sides of the truck frames, so that horizontal flanges of such angles to which the opposite ends of the lower crosstie are connected project inwardly from the frames.

Figure 2:
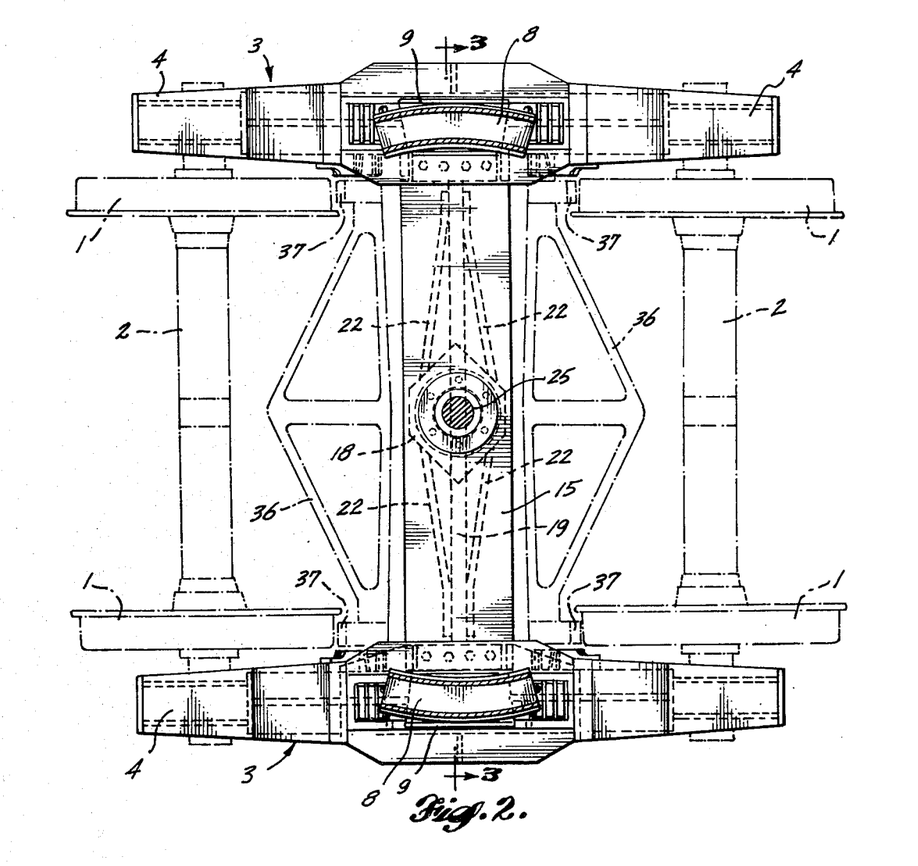
FIG. 2 is a plan of FIG. 1.
Figure 3:
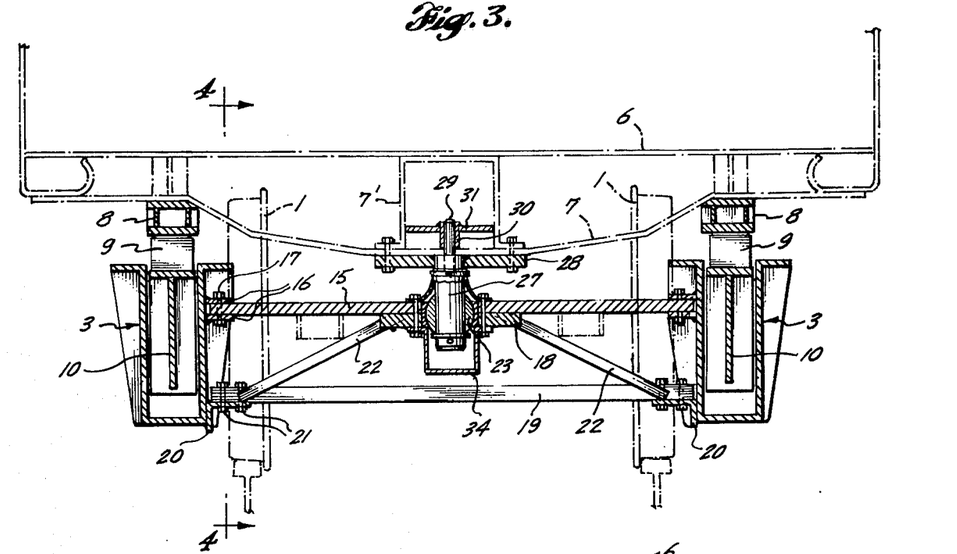
FIG. 3 is a transverse section taken along the line 3—3 of FIG. 2.

The outer ends of the lower crosstie chord 19 are connected to the central portion of the upper crosstie chord 15 by two pairs of diagonal truss web braces 22. Each web brace is inclined upwardly and inwardly from an end of the lower crosstie. The braces of each pair preferably diverge from the lower crosstie end toward the central portion of the upper crosstie, as shown in FIG. 2. The lower ends of such braces are welded or otherwise secured to opposite sides of the lower crosstie. The upper and inner ends of these braces are secured, such as by welding, in spaced relationship to the edge of the central reinforcing plate 18. The opposite triangular portions of the truss thus formed by the end portions of the upper crosstie chord 15, the diagonal web braces (crossties) 22 and the portions of the truck side frames between the upper and lower crossties are very rigid to prevent relative tilting of the side frames. The central portion of the truss can, however, be twisted comparatively easily particularly because the central portions of the upper and lower chord 15 and 19 are directly connected by web structure to permit the side frames to rock lengthwise of the truck relative to each other.

The central portion of the truss connecting the opposite side frames of the truck is connected to the railway car body by pivot structure which does not carry any vertical loads but strongly resists relative horizontal displacement of the body and the truck both transversely and longitudinally of the railway car. Such connecting structure will, however, permit relative rotational movement of the railway car body and truck and also relative tilting movement of these components.

Figure 5:
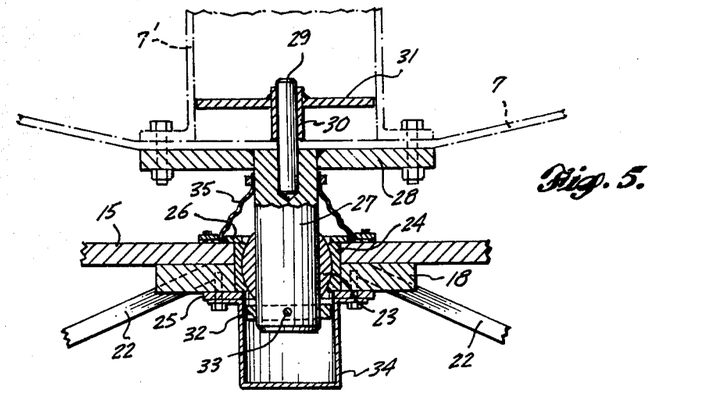
FIG. 5 is an enlarged vertical detail section of the center pin shown in FIG. 3.
Figure 6:
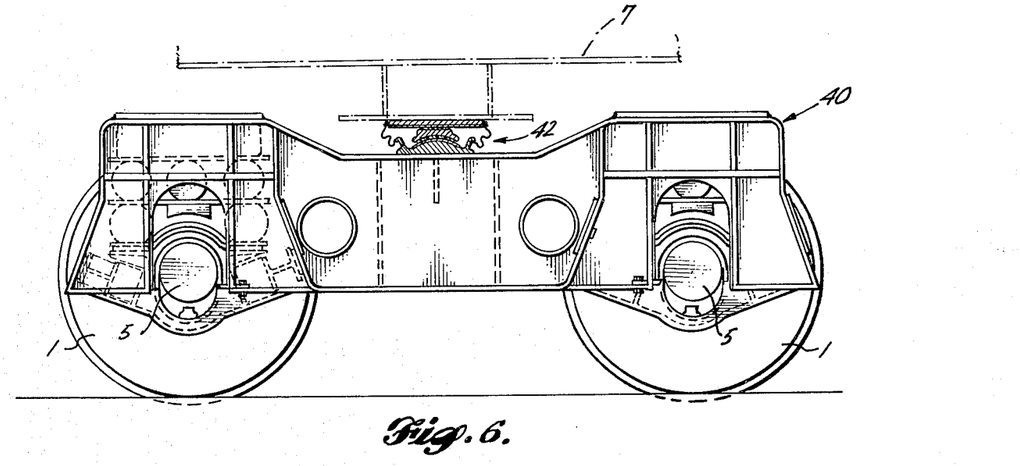
FIG. 6 is a side elevation of a preferred form of improved truck embodying the principles of the invention.

To guide the railway car body and truck for relative tilting movement, the connecting structure between the truss connecting the side frames and the body bolster includes a ball joint having a ball 23 fitted in a socket 24 as shown best in FIG. 5. This socket is fitted into a central aperture extending through the central portion of the upper crosstie plate 15 and the central reinforcing plate 18. The ball 23 can tilt universally in its socket 24 and may also be rotatable in such socket. The ball socket is held in place in the central apertures of the upper crosstie 15 and the reinforcing plate 18 by a lower retaining plate 25 attached to the bottom of such reinforcing plate and by an upper retaining plate 26 attached to the top of the crosstie 15.

Through the central portion of the ball 23 extends a center pin or side thrust connector 27 connecting the body bolster 7 and the truck truss to prevent relative shifting of the car body and truck horizontally Such connector may be in the form of a cylindrical pin received in a cylindrical bore in the ball 23 so that these parts can rotate relatively, but is not necessary that these parts be rotatable relatively if the ball 23 can rotate in its socket 24. The upper end of this connector is rigidly secured to a mounting plate 28 bolted rigidly to the car bolster 7.

To provide a better anchor between the side thrust connector 27 and the body bolster, the lower end of an anchor pin 29 may be secured in a blind bore in the upper end of the side thrust connector. Such anchor pin extends upward through a sleeve 30 which is secured to a center box 7' of the body bolster. The lower end of the side thrust connector is prevented from being lifted out of the ball 23 by a collar 32 encircling the lower end of such connector beneath the ball and secured to the connector by a crosspin 33. The lower end of the connector 27 and the lower side of the ball joint can be protected by a cap 34 preferably in the form of a cup which can hold lubricant. The upper side of the ball joint can be protected by a flexible sheath 35 bridging between the upper crosstie 15 and the thrust connector.

Connecting the opposite truck frames 3 by a central truss affords space between such truss and the axles 2 in which to mount conventional brake-actuating mechanism 36 at opposite sides of the truss, as shown in phantom in FIG. 2. Such brake-actuating mechanism can be supported from the upper crosstie 15 or from the truck frames, or from the truss, as may be preferred. Each brake-actuating mechanism either can operate two brake shoes 37 for engaging respectively the peripheries of the wheels 1 on opposite ends of an axle 2.

In previous railway car structures it has been customary for the load of a railway car to be transferred from a body bolster to a truck bolster through a center pivot. It is then necessary for such loads to be carried by the truck bolster to the side frames. Consequently, it has been necessary for the truck bolster to be of very strong, and consequently heavy structure. It is not necessary for the truss connecting the truck side frames in the present structure to transmit large vertical loads to the side frames, because, as has been mentioned above, the central structure connecting the body bolster and the truss is movable vertically so that it will not transmit vertical loads.

The embodiments of the truck illustrated in FIGS. 6–24 are illustrative of an improved form of the invention. The truck again has conventional wheels 1 mounted on axles 2 by bearings 5 in a conventional manner. Side frames 40 are supported by the axle bearings as in the previous embodiment of FIG. 1.

The railway car body is supported by a body bolster 7 similar to that of the previous embodiment. The body bolster is supported on each side by an omni-directional bearing 42. A center pin spring mechanism 44 provides compliance at the center pin 27 of the body bolster while an improved spring and damping suspension system 46 (FIG. 20) suspends the side frame on the axles.

Figure 7:
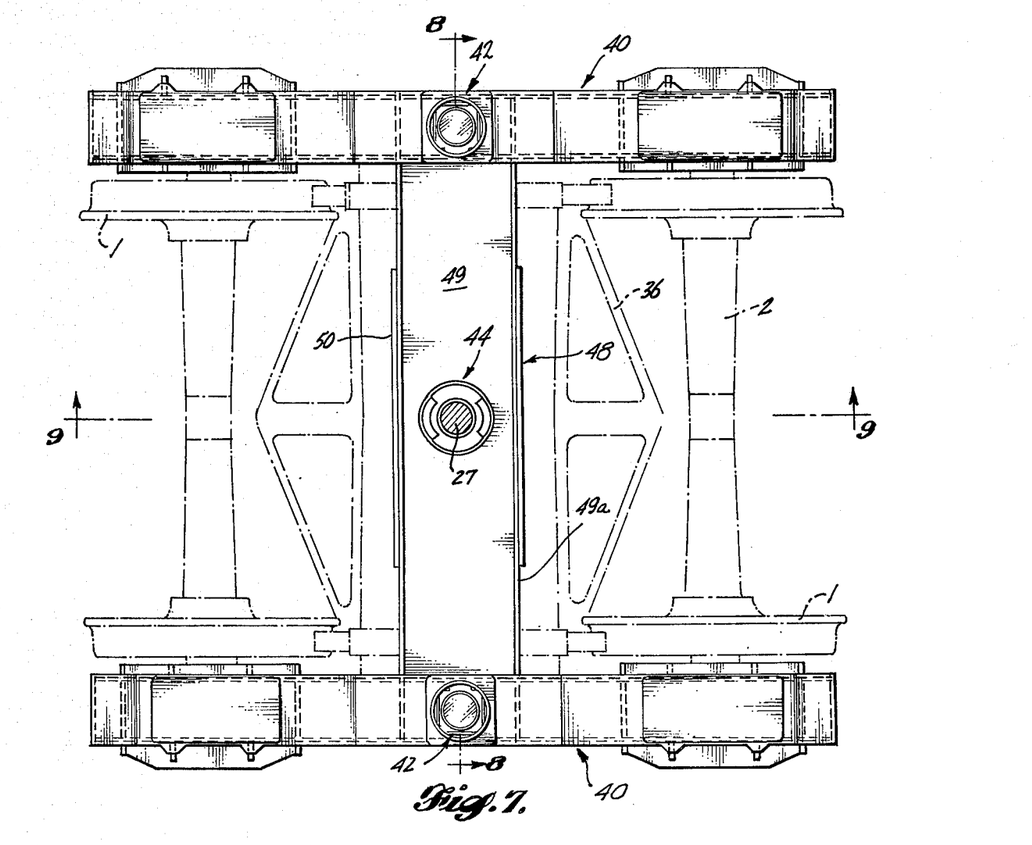
FIG. 7 is a plan of the truck shown in FIG. 6.
Figure 8:
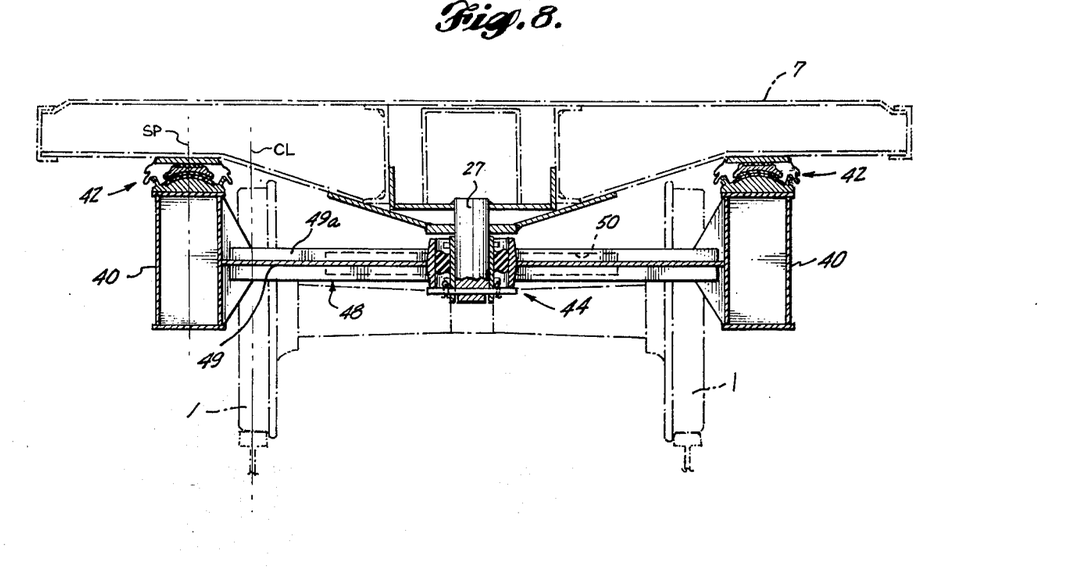
FIG. 8 is a transverse section taken along the line 8—8 of FIG. 7.
Figure 9:
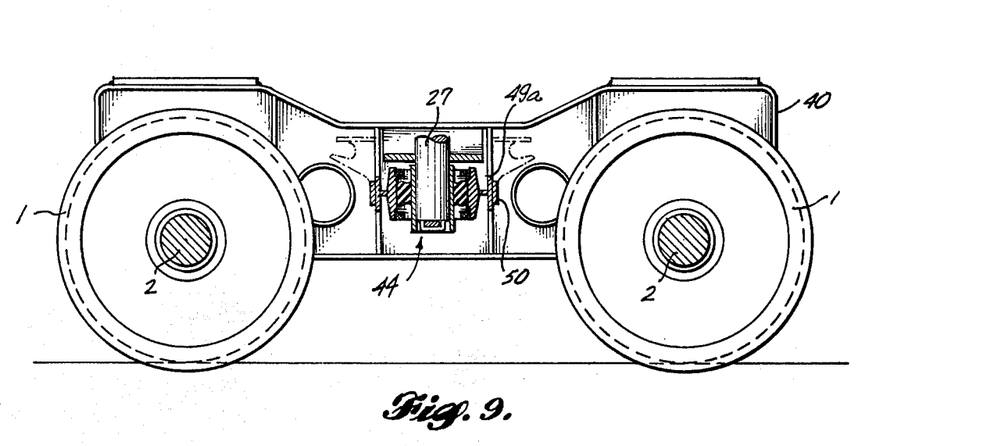
FIG. 9 is a longitudinal section taken along the line 9—9 of FIG. 7.

As best shown in FIGS. 7 and 8, the truck includes a torsionally compliant member 48 extending transversely and interconnecting the two side frames 40. The torsionally compliant member 48 serves the same function as the truss of the embodiment of FIG. 1, that is to utilize the "walking" characteristics to maintain relatively constant loading on each of the four wheels of the truck. The member 48 is preferably H or I shaped in plan and much simplified and less expensive than the truss. The member 48 includes a main transverse beam 49 having side flanges 49a and strengthening side bars 50. The torsionally compliant member is in effect a very flat beam with narrow flanges and is very stiff in the car body longitudinal direction. It is stiff in the tramming direction; that is, leaning in and out of the side frame, and significantly decreases bearing wear due to the fact the rigidity greatly reduces both tramming and parallelogramming and thus moment forces on the bearing will be much smaller.

The side bearings 42 provide omni-directional, low friction, high strength vertically incompressible load bearing support for the ends of the body bolster 7 directly upon the respective side frames 40. The side bearings 42 of this invention are best shown in FIGS. 10–14C of the drawings. The side bearing of FIGS. 10–14 comprises a lower bearing member or casting 52 which is fixed to the top of the side frame 40, a floating central bearing member or casting 58, and an upper bearing member or plate 61 which is fixed to the underside of the body bolster 7. The central and lower bearing members are maintained in continuous load bearing contact with each other by spring clip means, presently to be described, and by the weight of the car body on the truck.

Figures 10, 11, 12, 13, 14, 14A, 14B, 14C:
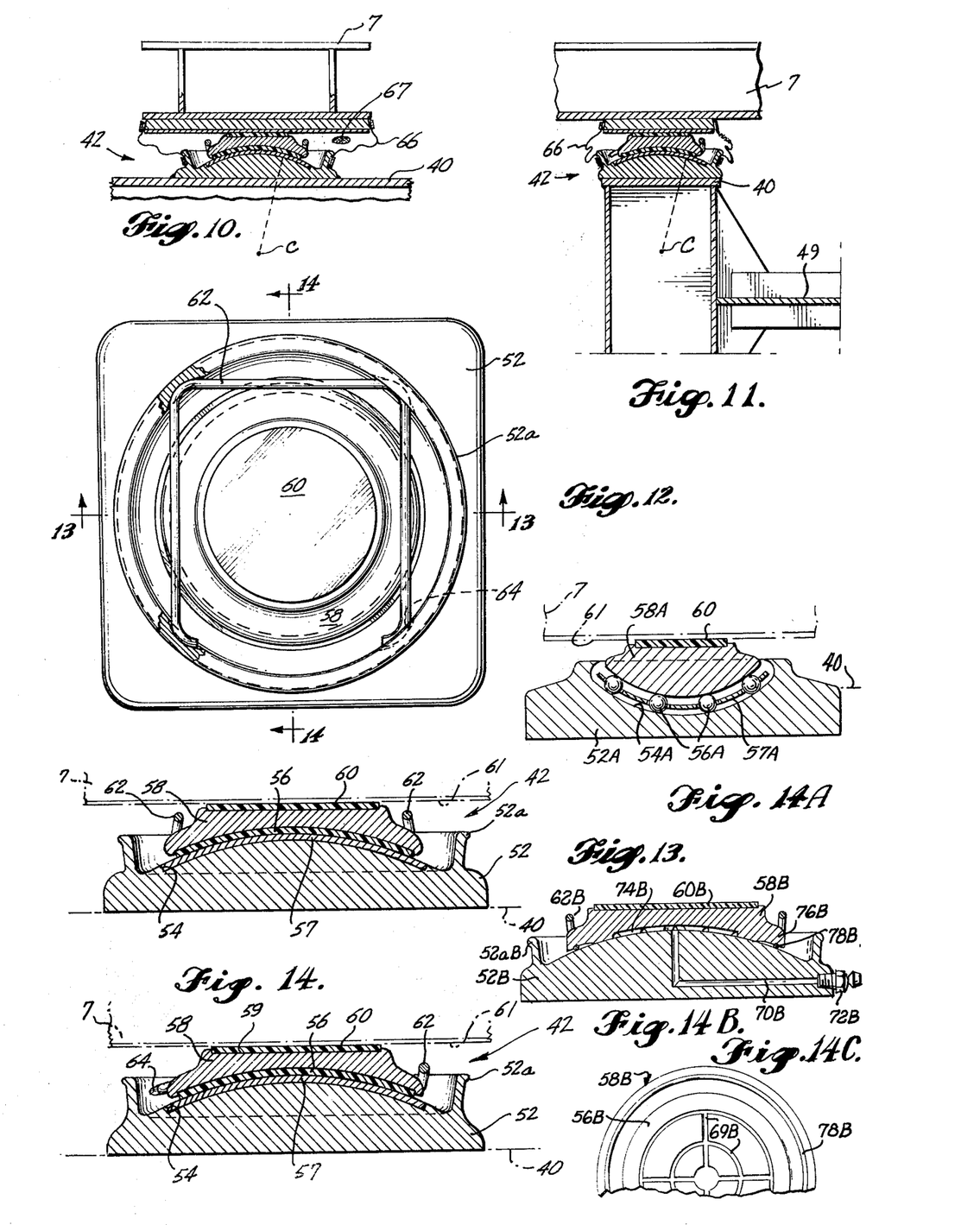
Figure 15:
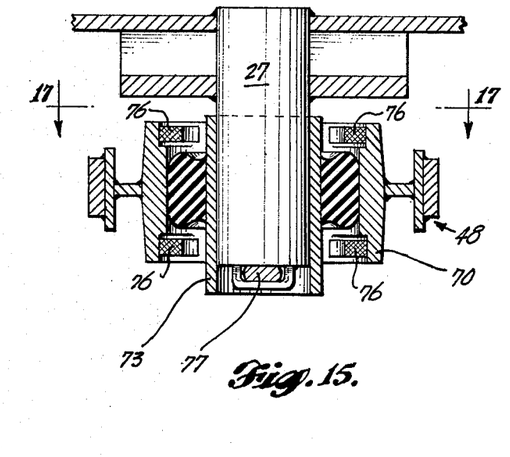
FIG. 15 is a section through the center pin of the truck shown in FIGS. 6–8.

The lower bearing member 52 includes an upstanding peripheral flange 52a and a domed midsection of generally hemispherical cross-sectional configuration. The domed midsection includes a recess 54 in which is secured a polished or smooth metal plate 57, also of generally hemispherical cross-sectional configuration. The floating central bearing member has a concave lower surface. A concave anti-friction composite disc 56 is fastened to the concave lower surface of the floating central bearing member 58 and bears against and mates with the domed midsection of the lower bearing member 52, as shown. The disc 56 has a concave lower surface of generally hemispherical cross-sectional configuration generally similar to that of the lower bearing member domed midsection and of substantially the same radius from common centroid C (FIG. 11). The composite disc 56 is fabricated of low friction material, which preferably has a coefficient of friction from 0.02 − 0.10 and most preferably about 0.04. The floating central bearing member 58 further includes an upper surface having a recess at 59 in which is fastened a second anti-friction composite disc 60. The disc 60 is flat and bears against the upper bearing member 61 which may be smooth or anti-friction coated. Thus, the central bearing member 58 can move omni-directionally with low friction on the lower bearing member 52 about the centroid C while simultaneously therewith the upper bearing member 61 can move omni-directionally in a plane with low friction relative to the disc 60.

The floating central bearing member is secured in the lower bearing member 52 by a spring clip 62 that is received within recesses 64 in the lower bearing member 52. Spring clip 62 prevents the floating central bearing member 58 from coming free of the fixed lower bearing member 52. The entire assembly is covered by a neoprene coated nylon boot 66 having a breather vent 67. The boot restricts entry of foreign matter into the vicinity of the friction surfaces. It will be recognized that the engaging contact surfaces of the upper, central or lower bearing members may be coated or impregnated with low friction material and one or both discs 56 or 60 eliminated.

Because there are frequent lateral as well as longitudinal motions between a truck and car body, it is considered essential that the antifriction surfaces of the bearing be permitted to move in any rotational direction in order to maintain the compliance of the upper floating casting surface with the underside of the car body plate 61 at all times. The side bearings further permit the transmission of all load from the car body to be directly made into the side frames without any cushioning arrangement to weaken the structural viability of the entire system. As most clearly shown in FIG. 11, the common centroid C of the mating concave-convex contact surfaces of the central and lower bearing members 58 and 52 is positioned centrally within the side frame 40 such that all vertically applied loads are resolved to a location within side frame 40. Preferably, the centroid C is located not only in alignment with the longitudinal center axis of the transverse torsional member 49 but also vertically on its center axis; however, the centroid C may be located above the longitudinal axis of member 49 in order to maximize the curvature of the mating concave-convex contact surfaces without uneconomically increasing the size of the central bearing member 58. The selected range of coefficient of friction, which can be varied depending on the type of material used for the antifriction composite disc, also provides important friction damping for the car body truck system which is of great value in terms of decreasing or eliminating truck shimmy or hunting. With the side bearings close to the side sills of the car body, the latter sills carry the forces and thus bending moments in the body bolsters are reduced allowing the use of the side sills to carry almost the entire vertical load without the necessity to transmit those loads to the center sill.

FIG. 14A illustrates an alternative form of side bearing. In this embodiment a lower member or casting 52A is provided with an upwardly facing concave seat 54A on which is positioned a circular bearing race 57A which holds a plurality of ball bearings 56A. A floating central member or round casting 58A rests on the bearings and is provided with an upper recess having the anti-friction composite disc 60. The disc 60 supports a polished plate 61 on the car body bolster 7 as in the preferred embodiment.

FIGS. 14B and 14C illustrate an additional form of the side bearing of this invention which is generally similar to the side bearing of FIGS. 10–14 (like parts are designated with like reference numerals and the suffix letter B) except that the lower concave surface of the floating central bearing member 58B is interrupted to form an annular land 56B, as shown (FIG. 14C). The undersurface of land 56B is generally arcuate in cross-sectional configuration and mates with the surface of the convex domed midsection of the lower bearing member 52B. Preferably, these mating concave-convex surfaces are of the same generally hemispherical cross-sectional outlines projected at substantially the same radii from a common centroid C, such that the central bearing member can move omni-directionally on the lower bearing member about the centroid of the lower bearing member domed midsection, as is the case of the side bearing of FIGS. 10–14.

A grease passage 70B is formed in the body of the lower member 52B and terminates at its outer and in an external grease fitting 72B. The inner end of the grease passage 70B communicates with the cavity 74B which is formed between the underside of the central member 58B and the domed midsection of the lower member 52B. As most clearly shown in FIG. 14C, the undersurface of the central bearing member includes grease grooves 69B which are arranged concentrically and radially about the center of cavity 74B. These grooves serve to channel and evenly distribute grease which is injected into the center point of the cavity 74B through the grease passage 70B. Thus, it is possible, by introducing lubricant at the center point of cavity 74B and allowing it to flow downwardly by gravity between the convex-concave bearing surfaces of the lower and central bearing members, to achieve long lasting and uniform lubrication. Central bearing member 58B includes a peripheral lip 76B, the undersurface of which mounts an O-ring wiper seal 78B. This seal removes dirt and contaminants from the load bearing surfaces. To provide low friction movement of the central bearing member relative to the lower bearing member, the lower surface of land 56B, or the surface of the lower bearing member domed midsection, or both such surfaces are smooth; however, it will be recognized that one or both of these surfaces may be coated, or impregnated with, or support a composite of teflon or other well-known low friction materials.

The modified side bearings of FIGS. 14A-14C each provides the same omni-directional vertically incompressible side bearing support as in the first preferred side bearing embodiment of FIGS. 10-14; but because of steel bearing support will be capable of carrying greater loads than that of the first preferred embodiment.

As is evident, the side bearing embodiment of FIG. 14A has a concave lower member, as opposed to a convex lower member of the first preferred embodiment of FIGS. 10-14. Obviously, lower member of the side bearings of FIGS. 10-14, or of FIGS. 14B and 14C, can also be concaved. Further, other satisfactory alternate configurations will be apparent to one skilled in the art, such as forming the plate 61 concave, convex, etc. so long as the vertically incompressible omni-directional conditions described above are satisfied such that vertically applied loads are resolved to locations within the side frames.

Figure 17:
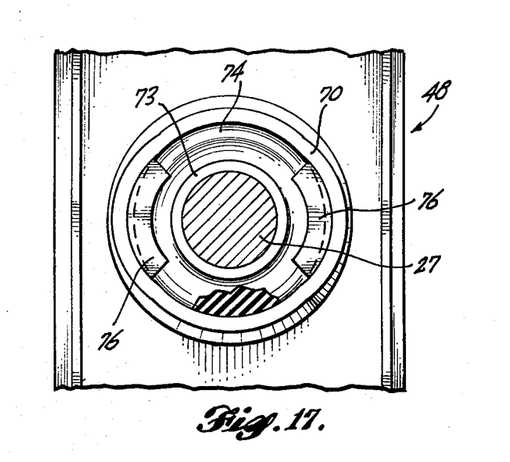
FIGS. 17, 18 and 19 are operational schematic view illustrating the single spring rate lateral compliance and the variable two spring rate longitudinal compliance of the center spring.
Figure 18:
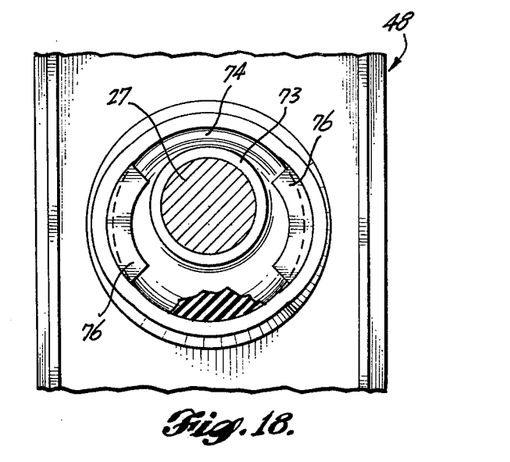
Figure 19:
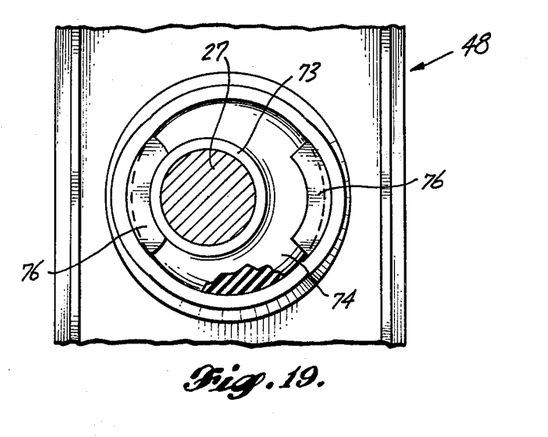
Figure 19A:
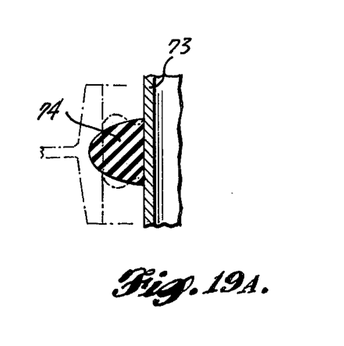
FIG. 19A is a schematic transverse section of a portion of the center pin of FIG. 16 with the elastomer relaxed.

Along with the frictional damping of the omnidirectional bearing 42, the rock-and-roll motion and other aforementioned dynamic forces have also been shown to be reduced by the use of a special compliant center pin mounting for limiting lateral and longitudinal movement of the car body relative to the truck. As best shown in FIGS. 15-19, 25 and 26, the center of the truck transverse member 48 is provided with a two diameter ring 70. The center pin 27 is surrounded by a sleeve 73 on which is fastened an elastomer 74 having a modulus of elasticity in the range of 800-1600 and preferably 1000-1200 psi tensile at 300% elongation. The elastomer 74 is generally parabolic in cross section when relaxed as best shown in FIG. 19A and is precompressed when installed an amount slightly greater than the maximum deflection in use. Consequently, maximum deflection will still provide wall contact with the rubber on the trailing side of the elastomer. The elastomer precompression during initial installation changes the shape to that shown in FIG. 16. The parabolic relaxed shape and precompression allows the use of a lower spring rate elastomer while assuring full elastomer contact with the ring 73 under all deflections. The forward and rear ends of the two diameter ring 70 have hard stops or stiff elastomer shock pads 76 bonded thereto. The shock pad location provides a two spring rate variable spring in the longitudinal direction only. For example, FIG. 17 shows the center pin in a centered unloaded condition. FIG. 18 shows the center pin shifted laterally. FIG. 19 shows the center pin shifting longitudinally and bringing into play the second spring 76. Thus it can be seen that a soft spring rate can be provided for lateral loads whereas the soft spring can be increased to a stiff spring under the greater shock loads in the longitudinal direction such as when cars hit one another.

Figure 16:
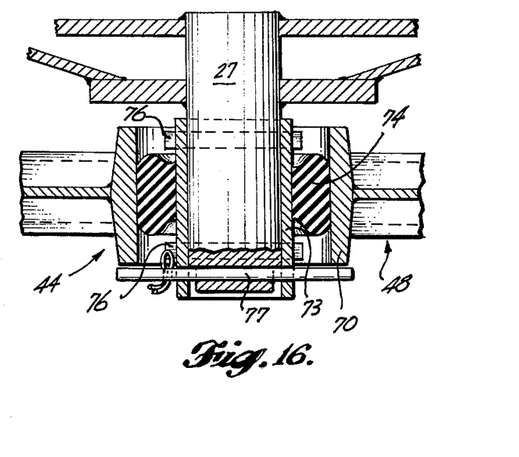
FIG. 16 is a transverse section through the center pin.

The sleeve 73 is held on the center post by a tapered pin 77 as shown in FIG. 16.

Figure 25:
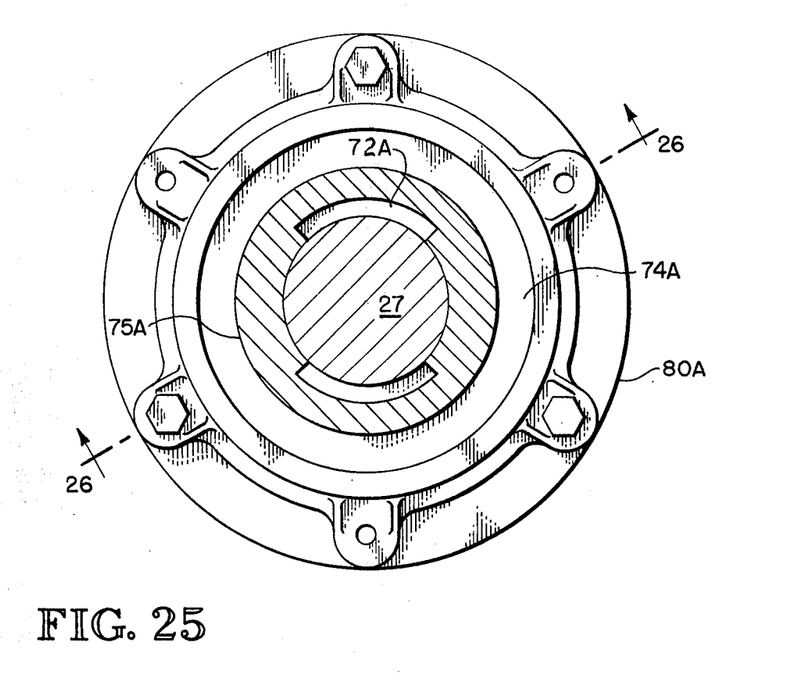
FIG. 25 is a horizontal section longitudinally of the railcar through a modified spring center pin.
Figure 26:
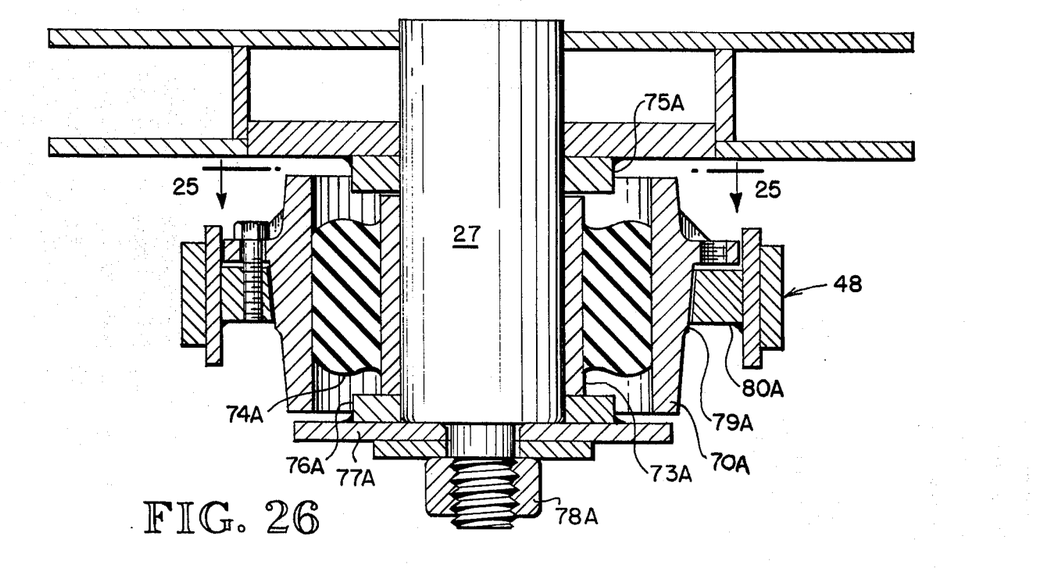
FIG. 26 is a vertical section taken along the line 26—26 of FIG. 25.

A preferred form of sprung center pin is illustrated in FIGS. 25-27. In this embodiment, the center of the transverse member 48 is provided with a cylindrical ring 70A. The center pin 27 is again surrounded by a sleeve 73A on which is bonded an elastomer 74A having a modulus of elasticity in the range of 800-1600 and preferably 1000-1200. The elastomer 74A is generally parabolic as in the embodiments earlier described. In the preferred embodiment a pair of upper and lower stop rings 75A and 76A of ductile metal are secured around the pin 27 to engage the ring 70A during maximum impact conditions and thus prevent overstressing of the elastomer 74A.

Stop ring 76A is connected to a plate 77 A that is secured to pin 27 by a nut 78A. The plate 77A prevents accidental vertical movement of the center pin. A unique feature of the center pin is that the sleeve 73A, elastomer 74A and ring 70A can be removed and replaced as a unit quickly without requiring an extensive disassembly of the individual parts. For this purpose the ring 70A is provided with a beveled guide surface 79A which seats in a beveled ring 80A secured to the transverse member 48. The beveled surfaces are sufficiently steep that horizontal loads on the pin will not push the ring 70A upwardly on the ring 80A. The total unit however centers itself when assembled for quick installation.

In both center spring embodiments of FIGS. 15-19 A and 25 and 26, the elastomer is permanently secured as by bonding to the pivot pin sleeve 73 or 73A and thus moves with the sleeve. The sleeve is secured to the pivot pin as by pin 77 (FIG. 15) or splines 72A (FIG. 25) to lock them together. The distal end of the elastomer is bonded and held by precompression against ring 70 or ring 70A. As a result, relative rotation between the car body and the transverse member will be self-centering returning the carbody to its original alignment on the truck after the rotation causing forces are removed.

The combination of friction damping of the side bearing and the damping and sprung movement at the center pin provides both a sprung and damped rotational movement with total resistance to rotation being about the same as or less than is encountered with conventional dry center plate car-truck construction. As is readily apparent, no vertical load is transmitted to the truck at the center pin but all horizontal loads are taken at this point. The side bearing support of the car body and precompression of the main load suspension elements of the truck maintain the car body on the sideframes even to the point of overturn of the railcar. Another function of the elastomer spring ring is to maintain the center of rotation of the body on an theoretical longitudinal axis through the transverse center of the axles in the case of rock-and-roll motion. This occurs due to the compliance of the elastomer which allows the center point to shift laterally rather than merely rock. In other words, the elastomer reduces the lateral forces tending to overturn the car body. Since the side bearings hold the center pin in a perpendicular alignment with the lengthwise axis of the transverse member 48, only horizontal movements are absorbed by the elastomer thus reducing random extraneous torsional forces on the transverse member resulting in a longer life for the transverse member. The horizontal movement also results in stop contact evenly between the upper and lower stop rings 75A and 76A with the ring 70A thus reducing destructive high point loading in the rings.

Figure 20:
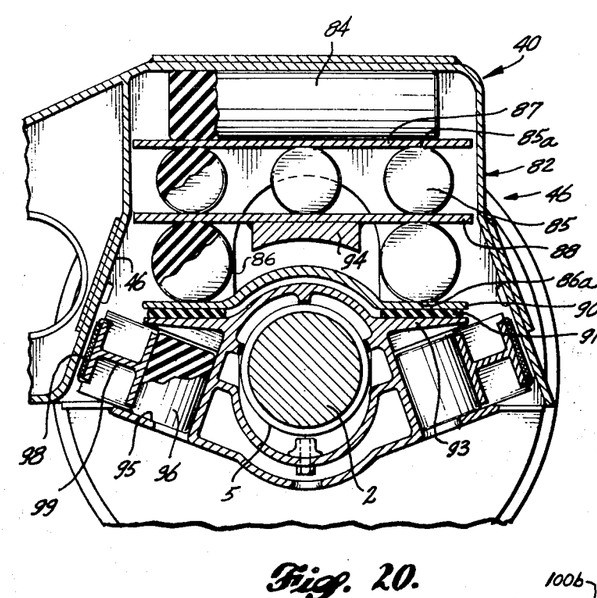
FIG. 20 is a side elevation with parts broken away of a spring and damping suspension system, shown in the embodiment of FIGS. 6–8.
Figures 21, 23, 24:
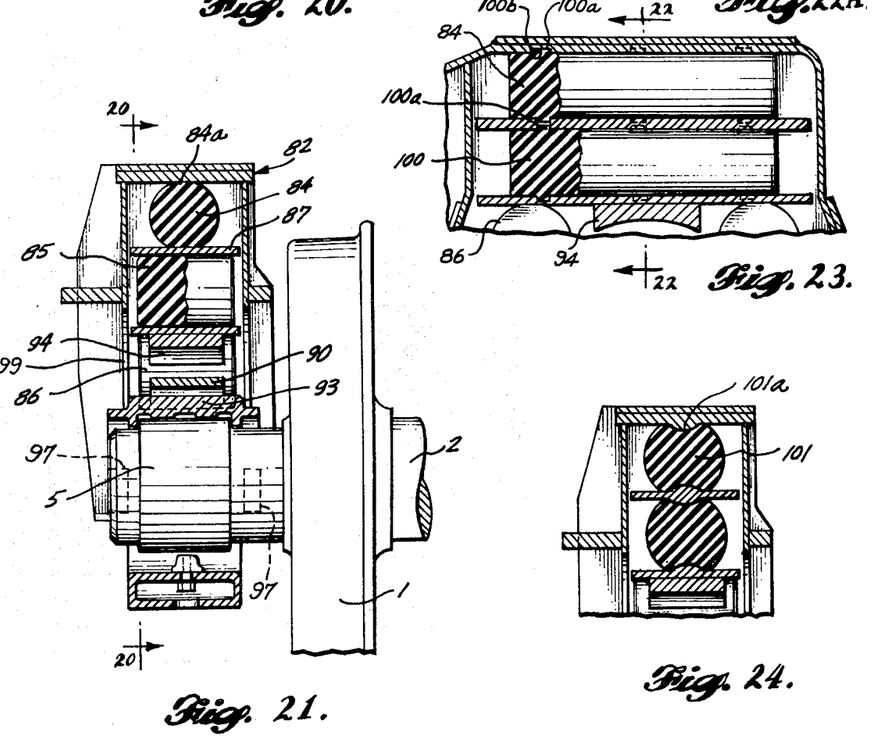
FIG. 21 is a transverse section of the suspension system shown in FIG. 20.
FIG. 23 is a longitudinal section of the modification shown in FIG. 22.
FIG. 24 is a transverse section of still an additional modified form of spring arrangement.

As best shown in FIGS. 20 and 21, one suspension system is illustrated for use in a railcar truck. The truck includes a truck side frame 40 having a suspension housing 82. Centrally positioned in the housing is a wheel axle 2 having a conventional roller bearing 5 and a wheel 1. Within the housing is a vertical stack of generally cylindrical spring elements designated as 84,85 and 86. The top spring element 84 abuts against the top surface of the suspension housing and lies on a horizontal spacer plate 87. The center axis of the spring element 84 lies in a longitudinal direction. The upper and lower surfaces of the spring element are provided with flats 84a. The second tier of spring elements 84 is also provided with flats 85a at top and bottom and includes three such elements, one centered over the axle 2 and the others spaced equidistantly on either side of the axle. The spring elements abut against the spacer plate 87 and a second lower spacer plate 88. Finally, the lower most spring elements 86 are two in number transversely located and equidistantly spaced on either side of the axle. The elements 86 are also provided with upper and lower flats 86a and abut against the lower spacer plate 88 and spacer plate 90. The spacer plate 90 is bonded to an elastomer pad 91 which mainly provides lateral spring return motion for the truck and railcar between the wheels and sideframes. The spring pad 91 is carried on a subhousing carrier or adapter 93 which is mounted on the bearing 5. A bumper or stop 94 limits downward movement of the housing 82 to prevent over compression of the spring elements 86 which would otherwise be possible because of their shape factor i.e. diameter to length being less than the Natural Rubber Producers Research Association of London, England, recommended ratio of length much greater than diameter to compensate for end bulge effects and utilize the formula:

$$\frac{F}{dE} = 1.25 \ (x/d)^{3/2} + 50 \ (x/d)^6$$

$F$ = load per unit length
$d$ = cross sectional diameter
$x$ = compression
$E$ = Young's modulus The spring elements 86 (lowest tier) are designed to be the stiffest springs. In use, the suspension is precompressed to the initial upper limit of the three inch travel allowed within the coupler vertical limits (preferably precompressed about 3 inches) and thus provides good spring effect even in the unloaded condition of the vehicle. The center tier of elements 85 are softer. The third or upper tier of elements is also a softer spring. The relative sizes and shapes, however, will vary depending on the application.

Figure 22:
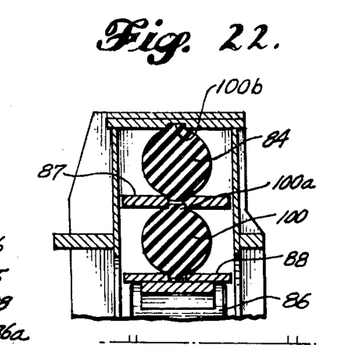
FIG. 22 is a transverse section of a modified spring arrangement.
Figure 22A:
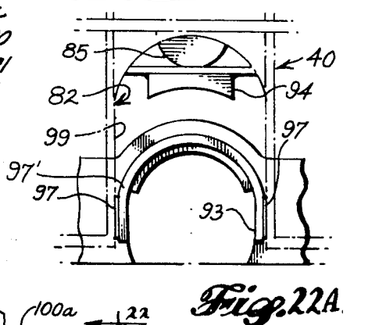
FIG. 22A is a fragmentary side elevation as viewed looking from the left in FIG. 21.

In a preferred embodiment of the invention shown in FIGS. 22 and 23, an upper pair of rod springs 84 and 100 are vertically spaced and are arranged with their axes in the longitudinal direction. Each of these spring elements 84 and 100 has a generally cylindrical shape having a modulus of elasticity in the range of 800 to 1600 psi and preferably 1000 to 1200 psi at a tension modulus (tensile elongation) of 300 percent for a truck of 70 ton capacity and a railcar empty weight of 88,000 lbs., 165,000 lbs. lightly loaded and 220,000 lbs. fully loaded. The bottom tier of spring elemtns 86 have a higher modulus of elasticity in the range of 2,000 to 2,500 psi and preferably 2,200 to 2,300 psi at 300 percent tension modulus. These lower spring elements although stiffer than the upper two layers provide, to a large extent, the soft portion of the spring rate in the suspension system.

Compression with light lading in the car will allow the springs 86 to absorb some of the loads but for most of it and all heavy lading, the upper spring elements come into play. It should be understood that the size, stiffness, number and arrangement of the springs is dependent upon the load capacity and type of application required, therefore the examples are to be considered as illustrative only.

Although there is inherently in the spring elements a certain amount of internal damping dependent upon the modulus of elasticity of the rubber used, it is insufficient to provide total damping necessary for most conditions experienced by vehicles. As an example, a rubber having approximately 15% internal damping in the embodiment illustrated may amount to less than 8% of critical (effective) damping for the total system for an application which may require as much as 20% of critical damping. The additional required damping is obtained from a unique variable damping system again best illustrated in FIGS. 20 and 21 of the drawings.

The variable damping system of this invention varies with vertical distance on a varying exponential curve which is designed to closely match that of the main suspension spring elements and add cumulatively to the inherent damping of the main load bearing springs. The varying exponential spring rate provides a slowly changing rate under low loads and rapidly increasing rate in the upper load range.

The friction dampers of this invention also provide load responsive lateral damping for the lateral pad springs where used. For this purpose, a horizontal lateral gap of about ¼ inch is provided on either side of the friction shoe 98 to allow lateral movement. In the damping system of this invention preferably cylindrical elastomeric spring elements 96 (although volute or other variable rate springs can be used) are arranged in a pair of cylinders 95 spaced equidistantly from and on each side of the rotatable axis, in this FIG. 20, the vehicle axle. A friction shoe element 98, of a conventional brake shoe type material having a coefficient of friction of approximately 0.4 is pushed by a rectangular piston 99, which abuts against the cylindrical spring element 96, against a side frame sloped surface 46 which later is parallel to element 98. It can thus be readily recognized that lowering the housing 82 due to increased loads or dynamic forces acting on the car will move the sloped surfaces 46 downwardly, sliding the sloped surface past the friction shoe 98 and compressing the spring elements. The greater the downward movement, the greater the outward force provided by the spring element 96 on the friction shoe thus increasing the damping force applied through the system.

As is also readily apparent, the symmetric spacing of the friction shoes and spring elements balance the damping and springing moments on either side of the axle 2 thus reducing undesirable moments and tending to center the carrier at all times. It is of course, understood that the angle of the sloped surface and/or the modulus of elasticity and shape of the spring element 96 can be varied to achieve the optimum damping configuration. Vertical guidance of the adapter 93 to prevent fore and aft movement of the wheels relative to the side frame is provided first by the friction shoes 98 and under more sever loading by replaceable steel wear plates 97, replaceable plate and mountings 97 secured to fore and aft surfaces of the adapter for engagement in the axle slot 99 of the side frame 4o. Preferably, the damping is directly related to the spring force provided by the spring elements 84, 100, 86 and it is one of the advantages of this system that the unique relationship is established between the spring and damping forces such that both spring and damping forces increase at approximately the same rate under loading dynamic or static. Thus, where loads are high, the spring force is high and the damping force is high which is a desirable situation. When the loads are light, the spring force is low and the damping force is low, thus cushioning the shock to fragile light lading such as fruit in a refrigerator car.

In some instances, it is desirable to provide additional stability to the cylindrical spring elements, particularly when the generally cylindrical elements shown in FIGS. 20 and 21 are not stacked directly in alignment with one another. For this purpose the modifications shown in FIGS. 22 and 23 are provided with bosses 100a that locate in recesses 100b of the plates 87 and 88. The bosses seated in the recesses provide locating and stability functions as well as allowing ease of assembly and movement of the stacked springs to or from the housing 82. The bosses are spaced in from the longitudinal ends of the plates to minimize stress concentration at the ends of the elastomers.

In FIG. 24 still additional spring elements 101 of a different arrangement are shown. In this embodiment, the flats are provided with recesses 101a. The shape of the spring element is a balance between the amount of rubber removed at top and bottom to provide economy of material plus proficiency of performance. The recess-type spring (still generally cylindrical) has basically the same volume as the more generally cylindrical spring. The shape of the curve of this modified form in cross-sectional quandrant is approximately the same as for 84 and 100. The shape in all the modified forms is quite important since too great a change from the generally cylindrical configuration changes the spring characteristics too severely to achieve the desired results.

While the forms of the springing and damping apparatus illustrated provide the best configurations, they are not to be considered as limiting. Furthermore, various flats can be added to assure a better bond (if required) to the spacer plates and the ends of the generally cylindrical elements can be relieved to prevent high stress concentrations provided they are not changed too drastically to preclude their meeting the requirements of shape factor, size, spring travel and desired variable spring rates necessary to a fully operative suspension system.

Similarly, while preferred forms of the other features of the invention have been illustrated and described, variations also will be apparent to those skilled in the art without departing from the principles herein described. Accordingly, the invention is not to be limited to the specific embodiments illustrated.

We claim:

1. A railway car comprising a truck including substantially parallel side frames spaced apart transversely, truss means having its length extending transversely of said truck, connecting said side frames and including a portion between said side frames torsionally flexible to enable said side frames to rock lengthwise of the truck relative to each other, car body means disposed above said truck, pivot means interconnecting said car body means and the central portion of said truss means, guiding said car body means and said truck for relative rotation about an upright axis, and means for transmitting the weight of said car body to said side frames independently of said pivot means and said truss means.

2. A railway car truck having wheels and axles and comprising an elastically rigid H truck frame including side members and a unitary transverse member fixed to and rigidly connecting said side members such that the horizontal forces applied to said transverse member by a pivot pin depending from an overhead car body are transmitted through said transverse member to said side members while maintaining side member vertical tram and preventing side member parallelogramming, at least a portion of said transverse member being torsionally flexible to permit said side members to swing relatively in respective planes substantially perpendicular to the lengthwise axis of said transverse member to thereby maintain substantially equal wheel loading.

3. In the railway car truck defined in claim 2, the transverse member being substantially centrally disposed between the ends of the side members, and the transverse member including a horizontal plate to resist relative swinging of the side members out of planes perpendicular to the transverse member much more strongly than resisting relative swinging of the side members in such planes to twist the transverse member.

4. In the railway car truck defined in claim 3, the transverse member plate having a centrally located hole, and a car body pivot received in such hole.

5. In the railway car truck defined in claim 4, including means for pivotally mounting the car body pivot in the transverse member plate.

6. The rail car truck of claim 2, said transverse member including an elongated horizontal beam having vertical forward and rearward flanges for providing stiffness against tramming and parallelogramming while allowing torsional deflection in said portion of said elongated horizontal beam.

7. The rail car truck of claim 6 including omni-directional side bearing means on said side members for carrying vertical loads from the car body carried on said truck, compliant center pin means externally friction damped, interconnecting the car body and said transverse member for transferring transverse and longitudinal loads without carrying substantial vertical loads, exponentially variable spring rate suspension means for supporting said side members on said axles, and exponentially variable rate friction damping means, said spring suspension means and said damping means providing non-linearly increasing forces in response to increasing static and dynamic loads on said car truck.

8. The rail car truck of claim 7 said compliant center pin means including a first elastomeric spring member encircling said car body pivot pin.

9. The rail car truck of claim 7, including a rotatable axis on which is symmetrically supported said variable spring rate suspension means including a plurality of generally cylindrical spring elements and horizontal spacer plates spaced in spring element-spacer plate-spring element array, and wherein said spring elements in said different tiers have different spring rates.

10. The rail car truck of claim 2 including omnidirectional side bearings interconnecting said car body and said side members, said side bearings including a floating member having a planar low friction bearing surface and hemispherical low friction means movable about its centroid, said side bearings being vertically incompressible for positive transmission of the loads between the car body and side members.

11. The combination of claim 10 said hemispherical low friction means including ball bearings.

12. The railway car truck of claim 2, wherein said transverse member constitutes the sole interconnection between said side members.

13. The railway car truck of claim 2, wherein said transverse member constitutes the upper crosstie of a truss structure interconnecting said side members.

14. A railway car truck comprising a pair of side frames suitable for mounting a pair of wheeled axles, unitary structural means interconnecting the side frames between the axles and movably engageable with a depending car body vertical pivot pin, and side frame non-resilient low friction bearing means mounted on each side frame and adapted to mate with cooperative bearing means mounted by an overhead car body such that a depending car pivot pin transfers essentially no vertical loading to said structural means, the said railway car truck being characterized in that said structural means includes a transverse member extending between said side frames and means fixedly connecting said transverse member with said side frames such that said structural means constitutes an interconnection between said side frames that is relatively rigid against horizontal loading to maintain said frame vertical tram and to prevent side frame parallelogramming; in that said structural means including said transverse member is sufficiently torsionally flexible to enable the side frames to rock in vertical planes to maintain substantially equal wheel loading; in that said structural means includes centering means mounted by said transverse member for engaging a depending car body pivot pin for transmitting horizontal loads therebetween and said transverse member is adapted for transmitting horizontal loads to the side frames; and in that the side frames are provided with resilient suspension means; and wherein the car truck can rotate about the axis of the pivot pin relative to an overhead car body without causing side frame bearing means separation or non-uniform loading, and so as to simultaneously maintain the side frame bearing means in load support of an overhead car body.

15. The railway car truck of claim 14 wherein said structural means is assembled in the form of a truss that maintains the stability of the side frames while permitting the side frames to rock.

16. The railway car truck of claim 14 wherein said centering means is characterized by an encasement mounted by said structural means at substantially the geometric horizontal midpoint of the railway car truck, means mounted by the encasement for engagement with a car body pivot pin enabling the pivot pin to transfer horizontal contact forces to said structural means, enabling the railway car truck to pivot about the axis of the pivot pin, and simultaneously enabling the railway car truck to tilt forward or aft relative to an overhead car body and the structural means to torsionally flex.

17. The rail car truck of claim 14 wherein said suspension means includes a plurality of generally cylindrical elastomer spring elements supporting said side frames on said axles, friction damping means including a pair of friction shoes engaging downwardly diverging friction plates on said side frames and symmetrically mounted about a rotating axis, damping spring means for urging said friction shoes against said friction plates, whereby the spring elements and friction shoes apply variable exponentially increasing springing and damping forces responsive to increase in loading on the car truck, said side frame bearing means including a fixed bearing member and a movable bearing member, low friction concaveconvex abutting surfaces on said bearing members omnidirectionally movable relative to one another about a centroid of said concave surface, and abutting low friction flat surfaces between said movable bearing member and one of said side frame or car body.

18. The railway car truck of claim 14, wherein said transverse member constitutes the sole interconnection between said side frames.

19. The railway car truck of claim 14, wherein said structural means comprises a truss in which said transverse member constitutes the upper crosstie.

20. The railcar truck of claim 14, wherein said side frame bearing means and said cooperative bearings means includes two side bearings respectively mounted by said side frames, each side bearing comprising lower bearing means adapted to be mounted in fixed relation to a respective side frame, upper bearing means adapted to be mounted in fixed relation to a car body, central bearing means in continuous load bearing contact with said upper and lower bearing means such that vertical loads can be transmitted substantially incompressibly from the car body to the respective side frame, said central bearing means and one adjacent bearing means respectively including a first pair of interengaged surfaces providing omni-directional, arcuate, low friction sliding movement of said central bearing means relative to the one adjacent bearing means about a centroid located within the respective side frame, said central bearing means and the other adjacent bearing means respectively including a second pair of interengaged surfaces providing omni-directional, planar, low friction sliding movement of the other adjacent bearing means relative to said central bearing means.

21. The railway car truck of claim 14, wherein said suspension means include four suspension units respectively supporting the end portions of said side frame from the end portions of their respectively associated axles, each suspension unit including a carrier supported by a respective axle, a housing secured to and movable vertically with a respective side frame relative to said carrier, elastomeric spring means supporting said housing from said carrier and applying a variable rate spring force to said housing in response to downward movement of said housing produced by application of a downward load to the respective side frame, and damping means applying a variable rate damping force to said housing simultaneously with application of said spring force in response to downward movement of said housing produced by application of a downward load to the respective side frame, said spring and damping means being carried by said carrier in symmetrical relationship to the rotational axis of the respective axle.

22. The railcar truck of claim 21, wherein said elastomeric spring means of each suspension unit includes a plurality of elastomeric spring elements, each including an elongated solid body of elastomeric material having curved sides, said spring elements being carried by said carrier and arranged in vertical tiers such that they are compressed radially in response to downward movement of said housing.

23. The railcar truck of claim 21, wherein said damping means of each suspension unit comprises an inclined friction surface formed by the respective housing, and friction shoe means carried by said carrier for exerting frictional effort upon said friction surface in response to downward movement of said housing, said friction shoe means including a friction shoe carried by said carrier and engageable with said friction surface, and an elastomeric spring element for biasing said shoe into engagement with said friction surface, said spring element including an elongated solid body of elastomeric material having curved sides and arranged such that it is compressed radially in response to movement of said friction shoe produced by engagement thereof with said friction surface.

24. A railway car truck, comprising: a pair of side frames suitable for mounting a pair of wheeled-axles, unitary structural means interconnecting said side frame between the axles and movably engageable with a depending car body vertical pivot pin, and side frame non-resilient low-friction bearing means mounted on each side frame and adapted to mate with cooperative bearing means mounted by an overhead car body for supporting an overhead car body such that a depending car body pivot pin transfers essentially no vertical loading to said structural means, said structural means including vertically spaced upper and lower plates extending between said side frames and secured thereto, at least two diagonal braces extending between said upper and lower plates, a first of said braces having one end secured to said lower plate adjacent a first outer end thereof and a second end secured to the central portion of said upper plate, and a second of said braces having one end secured to said lower plate adjacent a second outer end thereof and a second end secured to the central portion of said upper plate, the second ends of said first and second braces being spaced apart on either side of the center of said upper plate, said structural means constituting an interconnection between said side frames that is relatively rigid against horizontal loading to maintain side frame vertical tram and to prevent side frame parallelogramming, said structural means being sufficiently torsionally flexible to enable said side frames to rock in vertical plane to maintain substantially equal wheel loading, said structural means further including centering means for engaging a depending car body pivot pin for transmitting horizontal loads therebetween, said side frames further including resilient suspension means, and wherein the car truck can rotate about the axis of the pivot pin relative to an overhead car body without causing side frame bearing means separation or non-uniform loading; and so as to simultaneously maintain the side frame bearing means in load support of an overhead car body.

25. The railway car truck of claim 24 wherein said diagonal braces include two pairs of braces, each pair of said braces having first ends secured adjacent one outer end of said lower plate and second ends secured to the central portion of said upper plate, said second ends of the braces in each pair of braces being spaced from each other to cause the braces in each pair to diverge from the lower plate toward the upper plate.

26. The railway car truck of claim 25 wherein said centering means is mounted upon said upper plate between the spaced second ends of said first and second pairs of braces.

27. The railway car truck of claim 26 wherein said centering means includes an encasement mounted upon said upper plate, compliant means mounted by said encasement for engagement with a car body pivot pin enabling the pivot pin to transfer horizontal contact forces to said structural means, enabling the railway car truck to pivot about the axis of the pivot pin and simultaneously enabling the railway car truck to tilt relative to an overhead car body and the structural means to torsionally flex.

* * * * *